No. 646,876. Patented Apr. 3, 1900.
P. SCHRECK.
WATER PURIFIER.
(Application filed Aug. 26, 1899.)
(No Model.)
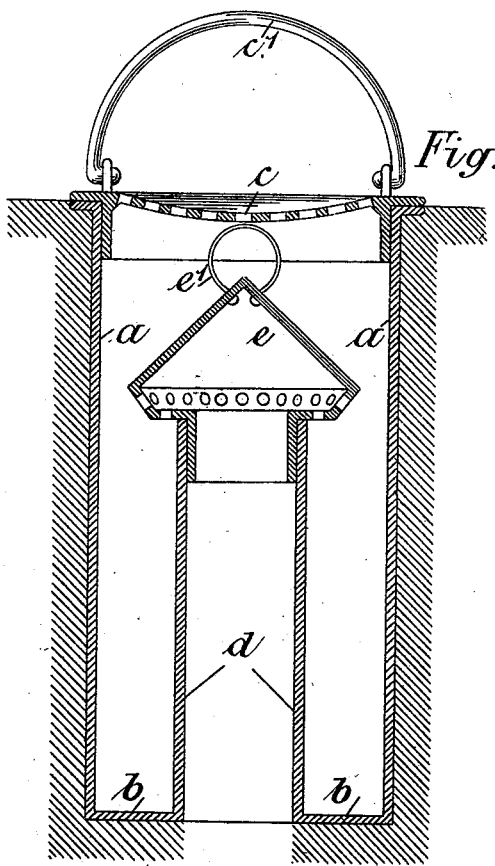
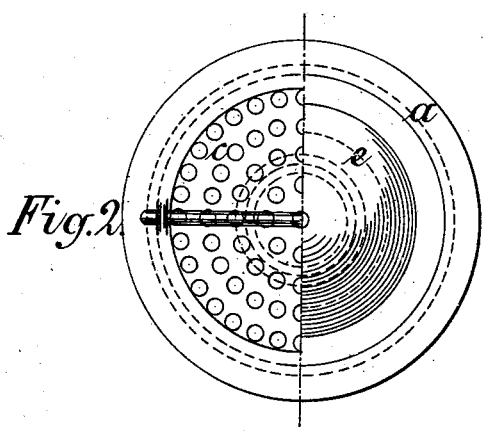
Witnesses:
Alfred Bosshardt
Stanley R. Bramall
Inventor.
Philipp Schreck
per Ferdinand Bosshardt
Attorney.

UNITED STATES PATENT OFFICE.

PHILIPP SCHRECK, OF VERSOIX, SWITZERLAND.

WATER-PURIFIER.

SPECIFICATION forming part of Letters Patent No. 646,876, dated April 3, 1900.

Application filed August 26, 1899. Serial No. 728,621. (No model.)

*To all whom it may concern:*

Be it known that I, PHILIPP SCHRECK, a citizen of the Republic of Switzerland, residing at Versoix, canton of Geneva, Republic of Switzerland, have invented new and useful Improvements in Water-Purifiers, (for which I have made application for patent in England, No. 15,784, bearing date August 2, 1899,) of which the following is a specification.

My invention relates to improvements in water-purifiers; and it consists of a tubular body closed at its upper extremity by a perforated lid through which the water enters the purifier and its bottom formed with a pipe having also a perforated lid at its top, which serve to purify the water entering the said tubular body and deposit on the bottom thereof the impurities contained in the water, while the purified water descends through the said pipe and flows out of the purifier at the bottom thereof.

My improved purifying apparatus is illustrated in the accompanying drawings, in which—

Figure 1 is a vertical section, and Fig. 2 a sectional plan.

$a$ is the tubular body; $b$, its bottom; $c$, its finely-perforated lid, and $d$ the overflow-pipe, the upper end of which is also furnished with a lid $e$, the perforations in the lids $c$ and $e$ being for the sake of clearness exaggerated in size on the drawings. The outer and inner lids $c$ and $e$ are each provided with drop-handles $c'$ $e'$, respectively, which facilitate their removal.

The perforations in the lid $c$ are formed more or less vertical, so as to allow the water to descend into the tubular body $a$ $b$, while the inclined perforations in the lid $e$ necessitate the water in the body $a$ $b$ to rise slightly in entering the overflow-pipe $d$ and cause the impurities therein to be deposited in the tubular body $a$ $b$.

The water-purifier described may, for instance, be fixed into the bottom of the basin of a fountain for the purpose of purifying the water therein which has become dirty by passing it through the purifier before its exit from the basin for further use.

What I claim as my invention, and desire to secure by Letters Patent, is—

A water-purifier, consisting of a tubular body furnished at its upper end with a lid $c$ and at its bottom with an upwardly-projecting overflow-pipe $d$ having at its upper end also a lid $e$, the lid $c$ being formed with vertical and the lid $e$ with inclined perforations, the former causing the water to descend into the tubular body while the latter purifying the water, cause the impurities to be deposited in the said tubular body, all substantially as set forth.

In witness whereof I have hereunto set my hand in presence of two witnesses.

PHILIPP SCHRECK.

Witnesses:
 ERNEST SCHÖRER,
 JEAN BURNIER.